(12) United States Patent
Behi

(10) Patent No.: US 7,517,400 B2
(45) Date of Patent: Apr. 14, 2009

(54) AQUEOUS BINDER FORMULATION FOR METAL AND CERAMIC FEEDSTOCK FOR INJECTION MOLDING AND AQUEOUS COATING COMPOSITION

(76) Inventor: Mohammad Behi, 16 Roosevelt Ave., Lake Hiawatha, NJ (US) 07034

( * ) Notice: Subject to any disclaimer, the term of this patent is extended or adjusted under 35 U.S.C. 154(b) by 456 days.

(21) Appl. No.: 11/254,293

(22) Filed: Oct. 20, 2005

(65) Prior Publication Data

US 2006/0054856 A1    Mar. 16, 2006

Related U.S. Application Data

(62) Division of application No. 10/301,515, filed on Nov. 21, 2002, now Pat. No. 6,986,810.

(51) Int. Cl.
*C09D 195/00*    (2006.01)
*C08L 5/00*    (2006.01)

(52) U.S. Cl. ............ 106/205.9; 106/205.3; 106/205.31; 106/205.7

(58) Field of Classification Search ............... 106/205.3, 106/205.31, 205.7, 205.9
See application file for complete search history.

(56) References Cited

U.S. PATENT DOCUMENTS

| | | | |
|---|---|---|---|
| 4,225,345 A | 9/1980 | Adee et al. | |
| 4,734,237 A | 3/1988 | Fanelli et al. | |
| 5,087,595 A | 2/1992 | Marsh et al. | |
| 5,250,251 A | 10/1993 | Fanelli et al. | |
| 5,286,767 A * | 2/1994 | Rohrbach et al. | 524/27 |
| 5,320,157 A | 6/1994 | Siak et al. | |
| 5,746,957 A | 5/1998 | Fanelli et al. | |
| 6,146,560 A | 11/2000 | Behi et al. | |
| 6,171,360 B1 | 1/2001 | Suzuki et al. | |
| 6,261,336 B1 * | 7/2001 | Behi et al. | 75/246 |
| 6,262,150 B1 * | 7/2001 | Behi et al. | 524/27 |
| 6,268,412 B1 | 7/2001 | Zedalis et al. | |
| 6,291,560 B1 | 9/2001 | Behi et al. | |
| 6,331,205 B1 * | 12/2001 | Paris et al. | 106/205.9 |
| 6,432,188 B1 * | 8/2002 | Takai et al. | 106/205.31 |
| 6,479,649 B1 | 11/2002 | Tsai et al. | |
| 6,508,874 B1 * | 1/2003 | Takai et al. | 106/205.31 |
| 6,635,099 B2 * | 10/2003 | LaSalle et al. | 75/247 |
| 6,783,805 B2 | 8/2004 | Siegal et al. | |

* cited by examiner

*Primary Examiner*—David M Brunsman
(74) *Attorney, Agent, or Firm*—Schweitzer Cornman Gross & Bondell LLP

(57) ABSTRACT

Low cost water based binder system was developed for shaping ferrous, nonferrous metals and/or ceramics parts by injection molding processes. The process comprises the steps of preparing a mixture containing a gel-forming powder comprising carrageenan, metal and/or ceramic powders, de-ionized water and a gel-strengthening additive. The mixture is injection molded to produce self-supporting articles. The present invention provides a direct compounding and molding of metal and/or ceramic feedstock. Additionally, a coating composition comprising gelatine, water and a metal and/or ceramic powder is used to form coating layers on selected materials.

14 Claims, 3 Drawing Sheets

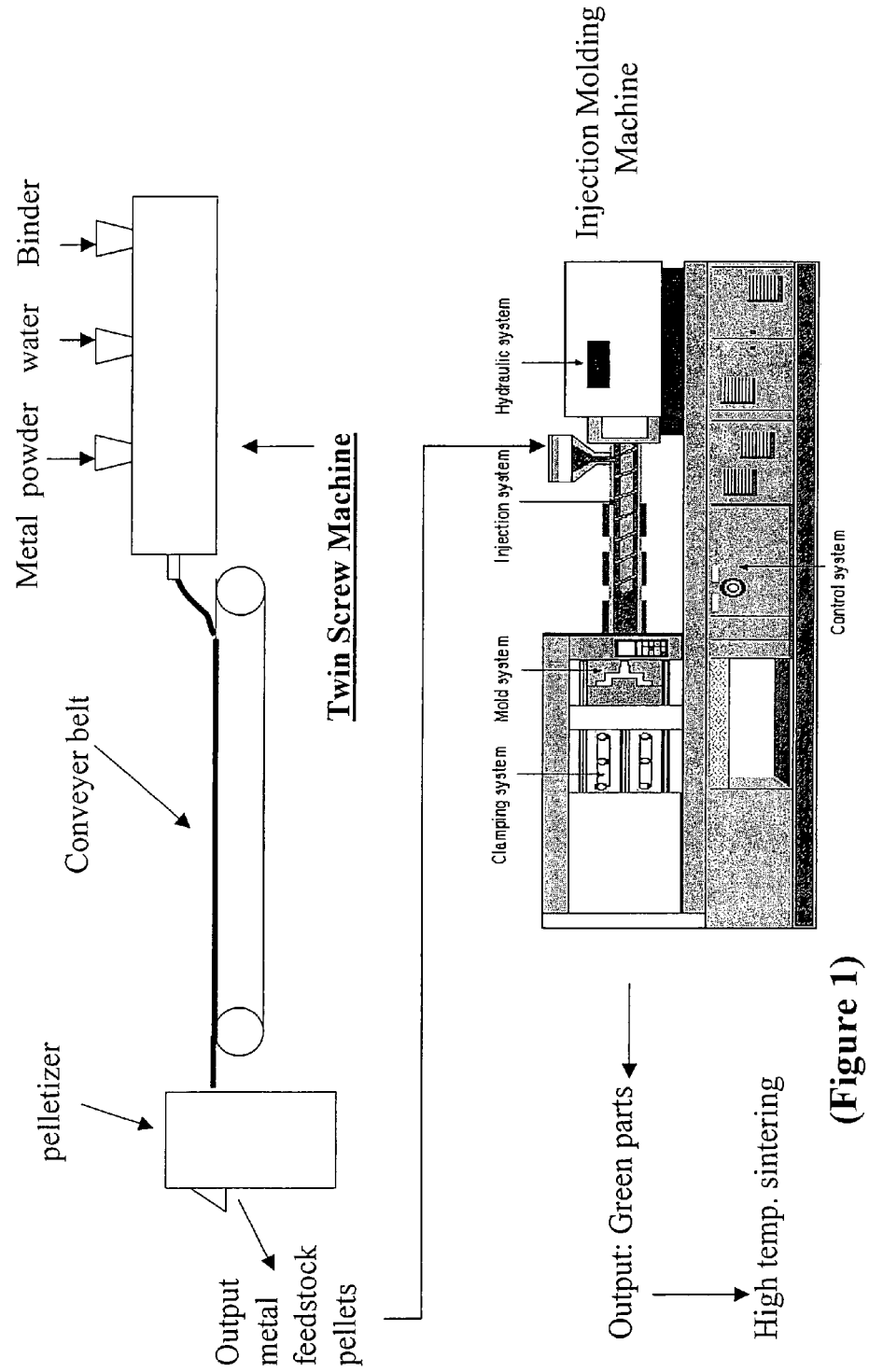
(Figure 1)

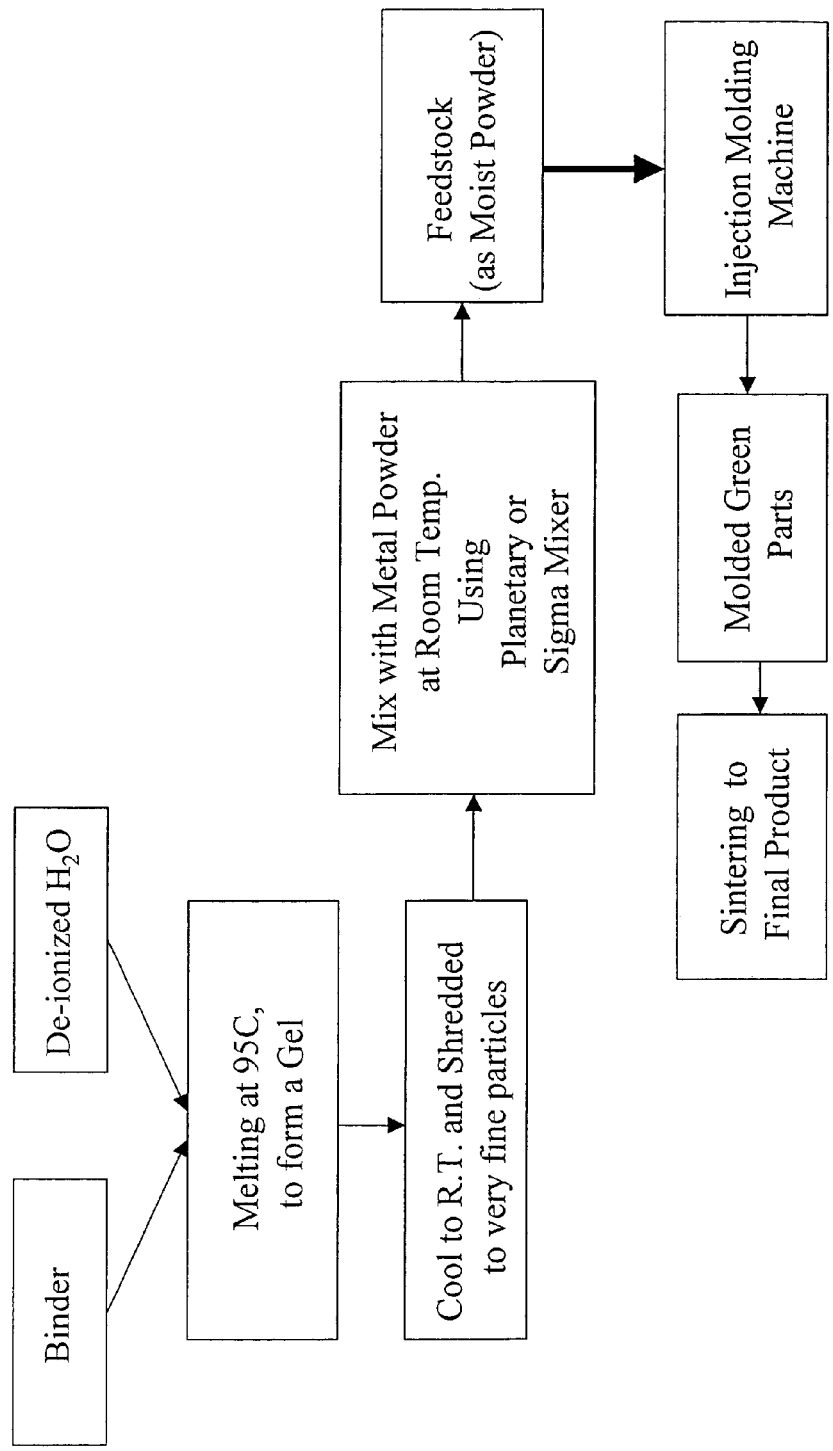
(Figure 2)

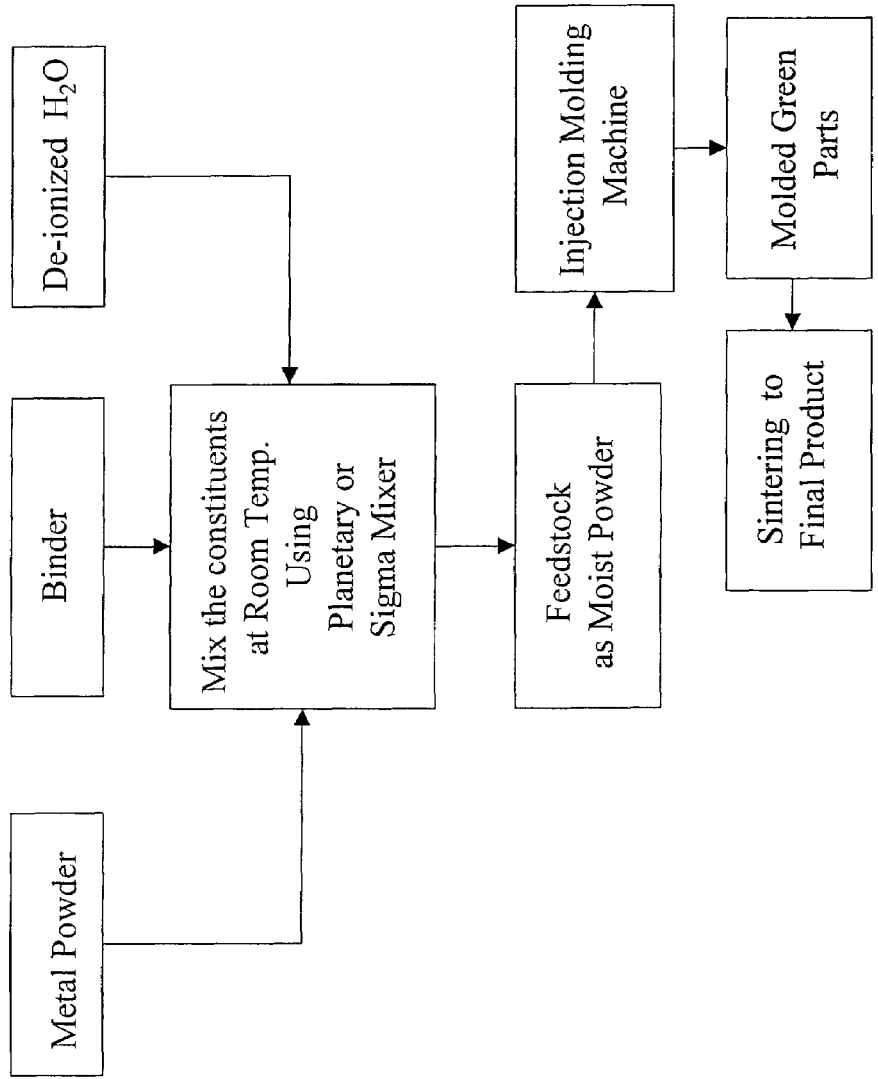
(Figure 3)

AQUEOUS BINDER FORMULATION FOR METAL AND CERAMIC FEEDSTOCK FOR INJECTION MOLDING AND AQUEOUS COATING COMPOSITION

Related Applications

This application claims the benefit of U.S. patent application Ser. No. 10/300,710, filed Nov. 20, 2002 and is a divisional of Ser. No. 10/301,515, filed Nov. 21, 2002 now U.S. Pat. No. 6,986,810.

BACKGROUND OF THE INVENTION

Various forming techniques are being used for fabrication of metal and ceramic parts. In the manufacturing of many metal and ceramic articles, a "green" body is formed of powder, binder, and possibly other ingredients. The green body is then typically fired to remove the binder and sinter to form the dense metal or ceramic articles. One of the desired methods to make green bodies is an injection molding process.

In injection molding, a mixture of metal and/or ceramic powder and binder is injected into a mold corresponding to the desired green body shape. Typically the mixture is heated to lower its viscosity before molding. The mixture is allowed to harden in the mold, and the mold is then opened to remove the green body from the mold cavity. The green body is then fired to remove the binder and sinter the part to near theoretical density.

More specifically, waxes are commonly employed as binders because they fulfill the rheological requirements of high fluidity at moderately elevated temperatures (150-220° C.) and substantial rigidity at temperature below 15° C. Wax formulations normally comprise between about 10 to 20% wax by weight of the formula. During the firing process, wax is initially removed from the green body. This initial step of the firing process may have an adverse influence on the quality of the post-molding sintered parts. This step requires exclusive equipment and very long binder burnout time to avoid the development of creaks in the part.

As an alternative to the aforesaid injection molding process, the use of agaroid as binder in the manufacture of parts from metals or ceramic powders has been disclosed (U.S. Pat. No. 4,734,237). This binder system resolve the binder burnout difficulty associated with the wax binder systems. However, higher cost associated with agaroid binder system, which significantly reduces the profit margin of the final product. Also, the low gelling temperature (35-39° C.) of agaroid binder system prolongs the molding cycling time, which adversely effects the production rate. The feedstock material is compounded using twin screw machine to mix the binder, metal powder and water to produce pellets. The pellets are transferred to the hopper of an injection molding machine for molding.

This invention provides novel molding compositions useful in forming metal and/or ceramic parts, which not only allow for the production of complex shapes and reduction of the firing times for such parts, but also reduced the cost of the binder by 33% and the molding cycle time by 25%. Furthermore, this invention provides a Direct Compounding/Molding technique, which eliminates the use of twin screw machine for compounding feedstock. This technique will hereafter be referred to as "DCM."

This invention also teaches a new aqueous binder system to form a thin or thick singles or multi layers of metal, ceramic or metal/ceramic composite coating on the green molded articles. The selected area or the whole green injection molded parts could be spray or brush coated with the specific ferrous, non-ferrous alloys, refractory metals or ceramic coating slurry made with this binder. This coating creates a dense layer after sintering.

BRIEF SUMMARY OF THE INVENTION

This invention pertains to a low cost aqueous binder system for shaping metal and ceramic parts from powders, and molding compositions therefor. More particularly, the invention is directed to molding compositions containing low cost aqueous binder for forming high quality, complex articles which exhibit sufficient green strength and which can be readily sintered without experiencing cracking, distortion, to near theoretical density. In contrast, the invention reduces the high cost associated with prior art by 33% and reducing the molding cycle time by 25%.

This invention also provides in-situ aqueous metal and/or ceramic coating formulation. The coating slurry provides a unique technique to form a thin or thick metal and/or ceramic layer on molded green parts. The coating slurry is applied on a selected surface or the whole surface of a molded green part and allowed to be dried. During the sintering process the coating forms a strong and dense layer on the part.

More particularly, the invention is directed to a process for shaping parts from metal and/or ceramic powders and mixtures thereof, which comprises a low cost gel-forming binder powder containing 5 to 20 weight percent $H_2O$. The present mixture comprises metal and/or ceramic, or metal/ceramic composite powders, 1-5 weight percent hydrated carrageen binder material, and one or combination of several gel-strengthening additives. This mixture is supplied in a heat-retainable hopper of a conventional injection molding equipment in which it is injection molded under conditions of temperature and pressure to produce a self-supporting article.

Carrageenan is the hydrocolloid extract from Chondrus and Gigartina species. Particularly preferred is Kappa-carrageenan which is mostly an alternating polymer of D-galactose, 4-sulfate and 3,6-anhydro-D-galactose sold by the TIC Gums Company as Colloid 710H.

The invention also relates to an injection molding process comprising the steps of forming a mixture containing a metal and/or ceramic powders, a gel-strengthening additive, a hydrated gel-forming composition which forms a viscous liquid at 80-100° C. and reaches a gelling state at 40-45° C. The said mixture is injected at a temperature above the gel point of the hydrated gel-forming material into a mold, cooling the mixture in the mold to a temperature below the gel point of the gel-forming material to produce a self supporting articles, and removing the article from the mold.

This invention also presents an aqueous metal and/or ceramic coating formulation which is used to form an in-situ thick or thin layer of selected material such as: titanium carbide, tungsten carbide, tantalum, stainless steels, non-ferrous alloy, molybdenum or multi layers of metal and ceramic on a molded green part. Then, it is co-sintered to near full density. This presents an easy, low cost and quick technique to create or design in-situ multi surface layer properties on a single part for specific applications. The binder used in the formulation of this coating slurry is edible gelatine and it is environmentally safe during debinding. This commercially available gelatine is comprised of 84-90% protein, 8-12% water and 2-3% mineral salts.

This invention provides the DCM process by premixing metal powder with hydrated (5 to 10 wt % deionized water) binder powder at room temperature. The mixture is directly fed into the hopper of an injection molding machine. The mixture is melted in the barrel of the machine at 70-98° C. and then injected into a mold cavity. The mold temperature is maintained lower than room temperature (10-24° C.). The DCM process reduces the feedstock production cost by eliminating the use of a twin screw extruder for compounding. Simplicity of this process allows for better processing control.

BRIEF DESCRIPTION OF THE DRAWING

The DCM part of this invention will be more fully understood and further advantages will become apparent when reference is made to the following detailed description and the accompanying drawing, in which:

FIG. 1 is a schematic representation of the steps of prior art for compounding metal feedstock.

FIG. 2 is steps of option one for Direct Compounding/Molding of metal or ceramic feedstock.

FIG. 3 is steps of option two for Direct Compounding/Molding of metal or ceramic feedstock.

DETAILED DESCRIPTION OF THE INVENTION

The present invention provides forming metal, ceramic and metal/ceramic composite parts from powdered materials selected from metal powders, ceramic powders and mixture thereof. The term metal powders as used herein include powders of pure metals, ferrous and non-ferrous alloys, intermetallic compounds, and mixtures thereof. The term ceramic powders as used herein is intended to include, powders of such materials as carbides, oxides, nitrides, borides, and silicides of metals, nonmetals or mixtures thereof, and mixture of such materials.

According to the process a binder-forming material and a solvent for binder-forming materials are initially mixed with metal and/or ceramic powders. The mixture should have sufficient flowability to be readily supplied to a mold cavity by any of variety techniques, and especially by injection molding. In general, the amount of the powder in the mixture is between about 60 percent and about 95 percent by weight of the mixture. Preferably, the powders constitute between about 75 percent and 92 percent by weight of the mixture.

The binder is a mixture of colloid (κ-carrageenan) powder consisting of D-galactose 4-sulfate and 3,6-anhydro-D-galactose. It is used with gel strengthening additives such as alkali metal salts such as LiCl, NaCl, KCl, or CsCl, and other additives such as maltose, mannose, glucose, raffinose and ribose. In-situ $H_2O$ having a pH of about 8.0 to pH about 11.0 was used as a solvent. This in-situ water comprises of deionzed or distilled $H_2O$ and about 0.05% to 6% of sodium or potassium tetraborate by weight of the water to maintain the pH level of the solvent. The preferred concentration of these additives is about 0.1 percent and about 1 percent by weight of the water. Also, a mixture of potassium sorbate and sodium benzoate (about 0.1% based on the water content) may be added as biocides to inhibit the growth of molds and bacteria. This binder-forming composition is employed because of its lower cost and its higher gelation temperature, a factor, which can significantly increase the rate of production of articles.

In the instant invention the colloid binder-forming powder is mixed with one or mixture of several sugar additives, and a gel strength enhancing additive chosen from the class of chloride compounds but not limited to lithium, sodium, potassium and cesium.

The sugar additives shift the gelation temperature to a higher value with increasing the concentration of added sugars. This has been attributed to the stabilization of junction zones in colloid gel by newly created hydrogen bonds between hydroxyl groups in the sugar and in the colloid molecules. The gelation temperature of 3.3 wt % (by weight of water) colloid gel is measured to be about 44 C. The addition of 0.2 wt % of potassium chloride to a colloid gel with same concentration enhanced the gelation temperature to about 59° C. This affect reduces the molding cycle time, which can dramatically increase the production rate of articles. Moreover, reduces the damage-ability of articles during the molding and handling process. Furthermore, the presence of sugar and chloride compound act as vapor-pressure lowering, which reduces the vapor pressure of the water content in the mixture. As a result, the moisture content of the mixture becomes more stable and does not condense out due to an environmental temperature fluctuation effect. These advantages of this invention address some of the problems, which are associated with the prior art.

The binder-forming composition comprises: (a) present colloid powder ranging between about 30 percent and about 80 percent by weight of the mixture, with amounts between about 40 percent and about 70 percent by weight being preferred, (b) raffinose or glucose powder between about 20 percent and about 70 percent by the weight of the mixture, with amounts between about 30 percent and about 60 percent by weight being preferred, (c) gel strengthening additives such as alkali metal salts (LiCl, NaCl, KCl, and CsCl) powder between about 0.01 percent and about 1.5 percent by the weight of the mixture, with amounts between about 0.05 percent and about 1 percent by weight being preferred. The raffinose or glucose increases the gelation temperature to shorten the molding cycle time.

The binder-forming material is provided in an amount between 0.5 wt % and about 7 wt % based upon the solid in the mixture. Higher amount does not have an adverse effect on the process, although may begin to reduce some of the advantages of our novel compositions, especially with respect to final shrinkage and production of net and near net shape articles. Most preferably, the gel-forming content in the mixture is between about 0.8 percent and about 5 percent by weight of the solid in the mixture.

The mixture further comprises deionized, distilled and/or in-situ water as binder-forming material solvent. The water is added in an amount sufficient to dissolve the gel-forming material and produce a homogeneous mixture of the viscosity necessary to make the mixture amenable to being molded by the desired molding process. Preferably, the water content of the mixture is about 4.5 percent and about 15 percent by weight of the mixture. More preferably, from about 5 and about 10 percent weight of the solid loading.

To make a moldable feedstock, the constituents of the gel-forming binder are mixed with stainless steel alloy such as 17-4PH metal powder to form a homogeneous composition. The composition may be blended in a heated mixer by generally well known techniques. Proper mixing equipment includes a sigma mixer, planetary mixer, or single or twin screw extruder, which most commonly used for compounding feedstock. In practice, solid powder materials and solvent (water) are fed into a heated barrel of an extruder in sequence and mix within the barrel to form the fluid composition, and discharged at open end. The extruded strands cooled and pass through a chopper to produce feedstock pellets.

Once the feedstock is prepared, it is preferably molded into solid articles. Various molding processes such as, injection molding, hot rolling, hot-pressing, extruding, slip casting, flat pressing and blow molding are well know in the art. For production of cylinders and complex shapes extrusion and injection molding are especially preferred. For purposes of this invention injection molding is preferably conducted in an injection molding machine. The feedstock fed into an injection molding device and heated to its fluid state. The fluid feedstock is injected into a mold of a predetermined shape and size under conditions sufficient to conform to the shape of the mold. The suitable mold temperature between about 10° C. to about 30° C. can be consummated before, during or after the fluid feedstock is supplied to the mold. Ordinary, the mold temperature is maintained at less than 30° C., and preferably is between about 16° C. and about 25° C. The temperature for melt processing is at least about 20° C. above the melting point of the binder. Molding is preferably conducted at a temperature ranging from about 77° C. to about 97° C. More preferably, the fluid feedstock is molded at a temperature ranging about 80° C. to about 97° C. A broad range of molding pressures may be employed. In general, the molding pressure is at least 200 psi (14.0 kg/cm$^2$), preferably, from about 200 psi (14.0 kg/cm$^2$) to about 8,000 psi (562.5 kg/cm$^2$) However, higher or lower pressures may be employed depending upon the molding technique used. More preferably molding pressure rang from about 200 psi (14.0 kg/cm$^2$) to about 3000 psi (210.9 kg/cm$^2$), and most preferably, is from about 250 psi (17.6 kg/cm$^2$) to about 1000 psi (70.3 kg/cm$^2$).

The molded article allows to cool to a temperature below the gelation temperature of the binder and then the green body is removed from the mold. The molded green body is then dried and placed directly into a sintering furnace to produce the final product.

The sintering conditions such as time, temperature and furnace atmosphere selected according to the powdered material (feedstock) employed to form the part. The sintering conditions are well known in the art for various types of materials and need not to be described herein. Ordinarily, the wax based binder systems requires a very long debinding times and separate debinding furnace. The part over certain thickness could not be debinded properly or economically is not feasible. Moreover, the gases generated during the debinding process are not environmentally safe. The binder system of the present invention is not associated with these problems. The binder system contains of about 80% by weight of the total binder water, which is evaporated during the drying of the parts. The rest of the binder removed during the sintering process with no difficulty and without any thickness limitations and, the resulting gas is not harmful to environment. Furthermore, in a separate debinding furnace is not needed and a complete sintering sequence is conducted in a single furnace. The fired products produced by the present invention result in very dense, net or near net shape products.

The water content of the colloid binder composition is not a proper environment for metal powders with low oxidation resistance. Stainless steel 17-4PH and 316L or other high chromium alloy steels are non-oxidizing powders. The Colloid binder composition has no adverse effect in terms of oxidation on these powders. The feedstock materials compounded with these powders were very stable. Not all the metal powders behave like stainless steel 17-4PH or stainless steel 316L powders in an aqueous environment. Iron powder, low alloy steels, tungsten and tungsten/cobalt powders are very unstable in aqueous environment and quickly oxidized in the presence of the water-based binder. The oxidation reaction consumes the moisture content of the feedstock material and generates $H_2$ gas and/or destroys the gelling property of the binder. To prevent such reactions and protect the powders from oxidation, several inhibitors have been discovered to be very effective. Addition of small amount about 0.05 wt % to about 1.2 wt % (based on water content) of sodium chromate, magnesium chromate or potassium chromate in the feedstock formulation efficiently stops the oxidation reaction of iron and iron-2% nickel and other low carbon alloy steels. These additives also found to be very well effective for protecting tungsten-iron-nickel alloys and tungsten carbide-cobalt alloys powders. Moreover, a mixture of sodium tetra borate and sodium silicate also found to be very effective to protect and stabilizes the tungsten-iron-nickel alloys and tungsten carbide-cobalt alloys powders in the feedstock formulations of this invention. The amount of this additive in the feedstock formulation are about 0.05 wt % to about 2 wt % and about 0.1 wt % to about 3 wt % base on the water content of the feedstock formulation respectively. Feedstock formulations with these additives are presented in the example section.

This invention also presents the DCM process, which reduces the cost of feedstock preparation of the prior art by eliminating the use of twin screw compounding machine. FIGS. 1, 2 and 3 show a comparison and significant advantage of the DCM process of this invention. FIG. 1 shows the steps of a typical twin screw machine, which is used for compounding prior art metal feedstock. FIGS. 2 and 3 illustrate options for the DCM process of this invention. In this process the feedstock material prepared and fed into a barrel of an injection molding machine in form of hydrated mixed powders. FIG. 2 illustrates one of the options for conducting this process by mixing the binder constituents with deionized, distilled or in-situ $H_2O$ in a sigma or planetary mixer and heated to about 98° C. to form a gel. The gel is cool to room temperature while mixing is continued to form a homogeneous past. A selected metal powder is added to the paste and blended together to form a hydrated mixed powder. The hydrated powder is then fed into a heated barrel of an injection molding machine and injected into a selected mold cavity. The other option, which is illustrated in FIG. 3, is to mix the binder composition and selected metal powder in a sigma or planetary mixer with deionized, distilled or in-situ $H_2O$ at room temperature and blend for 15 to 20 minutes. The hydrated feedstock powder is then fed into a heated barrel of an injection molding machine and injected into a selected mold cavity. The injection molding machine processing parameters such as back pressure and barrel temperature should appropriately be selected to insure proper melting and mixing of the feedstock prior to molding. The preferred back pressure is about 20 psi (1.4 kg/cm$^2$) about 200 psi (14.0 kg/cm$^2$). More preferably, the back pressure ranges from about 30 psi (2.1 kg/cm$^2$) to 120 psi (8.4 kg/cm$^2$) and most preferably, are from about 40 psi (2.8 kg/cm$^2$) to about 100 psi (7.0 kg/cm$^2$). Preferred barrel temperatures range from about 85° C. to about 97° C., more preferably from about 85° C. to about 95° C., and most preferably from 88° C. to about 92° C. The spiral flow characteristics of this feedstock was evaluated to be compatible with the pelletized feedstock. Several examples are presented in order to provide a more complete understanding of this part of the invention.

This invention also presents aqueous metal and/or ceramic coating formulation, which is used to form an in-situ thick or thin layer of selected materials such as titanium, titanium carbide, titanium nitride, tungsten, tungsten carbide, tantalum, molybdenum, cobalt, nickel, chromium, platinum, gold, copper, aluminum alloys, stainless steel alloys, super alloys, magnetic iron, aluminum oxide ($Al_2O_3$), silicon carbide (SiC), zirconium oxide ($ZrO_2$), mullite ($2Al_2O_3,SiO_2$), silicon nitride ($Si_3N_4$), silicon oxide ($SiO_2$), piezoelectric ceramic and mixtures of such materials.

The aqueous coating formulation of this invention is a mixture of a gelatine binder material and a solvent with metal and or ceramic powder. This mixture is proportioned with a carrier to be fluid enough to enable it to be readily applied on a surface by a various well known coating techniques such as spraying, dipping, air knife and gap coating. Generally the amount of the powder in the coating formulation depend on the type of coating technique being used and the articles geometry. Preferably, the powder content of about 50% and about 93% by weight of the mixture and most preferably is about 84% and about 90% by weight of the mixture.

The binder material employed for the coating formulation is gelatine. Gelatine comprised of 33% glycine, 22% proline and hydroxyproline and the remaining 45% is amino acids. The commercially available gelatine is comprised of 84-90% protein, 8-12% water and 2-3% mineral salts. It easily dissolves in water between 26-30° C. The coating composition comprises of gelatine, distilled, deionized or in-situ $H_2O$, de-foaming agent, biocides and metal and/or ceramic powder or mixture of such powders. The gelatine is preferably present in an amount of from about 0.1 to about 3 weight percent based on the water content of the composition, more preferably from about 0.5 to about 2.0 weight percent and most preferably from about 1 to about 1.5 weight percent. The water for the coating composition is about 10-40 weight percent, preferably 15-20 weight percent of the total batch. Suitable biocides include of potassium sorbate or sodium benzoate or a mixture of both. The amount of biocide present is from about 0.05% to 0.2% by weight of the gelatine binder, more preferably from about 0.08% to 0.15% by weight of the gelatine binder, and most preferably from about 0.08% to 0.1% by weight of the gelatine binder content. Appropriate dispersant solution such as Triton X-100, Darvan 821A (ammonium polyacrylate solution) may be added in some cases. If present, the dispersant is added in an amount of from about 0.08% to 3% by weight of the water content, more preferably from about 0.2% to 1.5% by weight of the water content, and most preferably from about 0.5 to about 1.0 weight percent. By way of example, a 100 g batch of coating contains 10-40 weight percent in-situ water (the in-situ water is a premixed solution of water, gelatine, dispersant, de-foaming agent and biocides) and 60-90 weight percent metal or ceramic powder.

The components of the coating formulation are mixed in a blender at about 25° C. to 30° C. to form homogeneous coating slurry. The coating is applied on the injection molded green parts made with the feedstock material described in the first section of this invention. The whole surface or selected sections of the surface of injection molded green parts is coated. The coating develops strong bounding with the surface when it is completely dried and has a good damage resistance. The coated green body is then placed directly into the furnace for firing. The part and coating co-sintered in the firing process to its near theoretical density. The benefits afforded by this coating include low cost, easy to use, non-toxicity, and environmentally safe. Moreover, no toxic gases generate during the firing process.

In the following Examples, Colloid 710H designates a preferred carrageenan binder material, kappa-carrageenan, which is mostly an alternating polymer of D-galactose, 4-sulfate and 3,6-anhydro-D-galactose sold by the TIC Gum Company.

Gelatin is a purified protein of animal origin that is isolated from naturally occurring protein collagen by partial hydrolysis.

EXAMPLES

The following non-limiting examples are presented for feedstock formulations, the DCM process and coating formulations in order to provide more specifically but not exclusively the different aspects of this invention.

Example 1

A batch of feedstock was prepared using 10 kg of 17-4PH stainless steel powder having an average particle size of 15 micron. A total of 180 g binder with a ratio of 2.2 of colloid 710H to glucose was mixed with 1132 g of in-situ water containing 2 g of sodium tetraborate to adjust the pH of the water to about 9.4 and 1.5 g potassium chloride. Also, mixture of 0.12 g potassium sorbate and 0.12 g sodium benzoate added as biocides to inhibit the growth of molds and bacteria. The 180 g binder and biocides were pre-mixed with the in-situ water. This mixture was transferred into a sigma blender and mixed for 10 minutes at room temperature. Then the temperature was raised to 93-98° C. (200-208° F.). The mixing was continued for 15-25 minutes and allowed the binder to melt. The metal powder added to the mixer in two steps. Initially 4.5 kg of the metal powder was added into the mixer and blended with the binder for 15 minutes, and then the remaining of the metal powder (2.5 kg) was added and mixed for 60 min. The feedstock material was allowed to cool to 32-37° C. (90-100° F.) before removing it for the mixer. The material was shredded twice to produce uniform small pieces of feedstock. The moisture content of the feedstock measured to be 9.7%. The moisture content of the material adjusted to 7.4% by evaporation of the excess moisture in air. The target weight of the material for 7.4% moisture was calculated and material exposed to an air circulation using a fan and monitoring the weight lost to reach the final weight. The feedstock material was stored in a sealed bucked. The flow characteristic of the feedstock material was evaluated using a center-gated spiral mold. The flowability of the feedstock evaluated at 500 psi and 1000 psi ($3.5 \times 10^3$ and $6.9 \times 10^3$ $KN/m^2$) using an Arburg-720C injection molding machine. The barrel temperature of the machine was set at 88° C. (190° F.) and mold temperature at about 24° C. (75.2° F.). The average distance flow for thirty molded samples at 500 psi and 1000 psi ($3.5 \times 10^3$, $6.9 \times 10^3$ $KN/m^2$) injection pressure was 3.35"±0.12 and 5.95"±0.20 (8.50±0.30 cm, 15.11±0.51 cm) respectively. The result indicates that the material has sufficient flowability for molding articles.

About 40 kg of feedstock material with this formulation was compounded successfully using a Werner & Pfleiderer ZSK-25 twin screw extruder at New Era Materials in Pawcatuck, Conn. U.S.A. The Colloid binder composition, in-situ water and 17-4PH powder simultaneously fed into the extruder through three separate inlets using volumetric K-Tron feeders. The processing temperature was 88° C. (190° F.). The material extruded on a conveyer belt through a three holes die head, then pelletized and collected into a container. The moisture content was measured to be about 7.7±0.15 percent by weight using a Mettler moisture analyzer. The flowability of the material at 500 psi and 1000 psi ($3.5 \times 10^3$, $6.9 \times 10^3$ KN/m$^2$) injection pressure was 4.0"±0.20 and 7.1"±0.30 (10.16±0.51 cm, 18.0±0.76 cm) respectively.

Example 2

Portion of the feedstock material from example 1 molded to make 140 parts using two cavity steel mold. The parts molded at 800 psi ($5.6 \times 10^3$ KN/m$^2$) injection pressure and 300 psi ($2.1 \times 10^3$ KN/m$^2$) pack pressure. The barrel temperature was 90° C. (194° F.) and mold temperature was 24° C. (75.2° F.). Initially, the cooling time (the time part stay in the mold after injection cycle) set to 15 seconds. The cooling time gradually reduced after every 25 shots. The lowest cooling time that the part could be ejected and remove from the mold cavity was about 6 second. The yield of this molding trial was >98%. The average part weight was 3.61±0.04 grams. A sintering experiment conducted on 30 of these parts under the following conditions to determine the final density and shrinkage.

| Temperature | Holding Time (hr.) | Atmosphere |
|---|---|---|
| 25° C. | 0 | Nitrogen |
| 450° C. | 3.5 | Nitrogen switch to hydrogen |
| 750° C. | 1 | Hydrogen |
| 1340° C. | 1.0 | Hydrogen |
| 900° C. | 5 min. | Hydrogen switch to nitrogen |
| 25° C. | 0 | Nitrogen |

The average density evaluated to be about 98.7% of the theoretical density and the average linear shrinkage was about 17.9%.

Example 3

Composite Feedstock:

This example illustrates the application of the invention for preparation of aqueous stainless steel/titanium carbide feedstock material. Stainless steel 17-4PH and titanium carbide powders having average particle size of 15 micron and 3.8 micron respectively were used in this example. A 10 g of same Colloid binder composition as example 1 was mixed with 505 g of in-situ H$_2$O, 0.1 g potassium sorbate and 0.1 g sodium benzoate in a sigma blender. The temperature was raised to 93-98° C. (200-208° F.) and melted the binder. A mixture of 4200 grams 17-4PH powder with 800 grams of titanium carbide powder was added to the melted binder. The mixing continued for about 50 minutes to produce homogeneous materials. The material was cooled to 32-37° C. (90-100° F.) before removing it for the sigma mixer. The material was shredded twice to produce uniform small pieces of feedstock. The moisture content of the feedstock adjusted to 8.3%. Spiral experiment conducted at 500 psi and 1000 psi ($3.5 \times 10^3$ and $6.9 \times 10^3$ KN/m$^2$) injection pressures to evaluate the flowability of the feedstock. The average flow distance at these pressures was 3.1±0.1 and 5.9±0.2 respectively. The result indicates sufficient flowability of feedstock to be sued for molding parts. Total of forty test bar samples was molded with this composite feedstock. The average weight of twenty test bars 0.125"×0.5"×4.94" (0.32×1.27×12.55 cm) was 21.46±0.14 g. The average weight of twenty test bars 0.25"×0.5"×4.94" (0.64×1.27×12.55 cm) was 43.05±0.08 g. These parts were molded at 920 psi ($6.4 \times 10^3$ KN/m$^2$) injection pressure using Arburg-720C injection molding machine.

Example 4

Tungsten Feedstock:

This example describes the preparation of tungsten feedstock formulation. Tungsten alloy powder comprising of 95 wt % tungsten, 3.5 wt % nickel, and 1.5 wt % iron powder was used in this formulation. This batch was prepared by mixing 8500 g of tungsten powder, 86 g Colloid binder composition described in example 1, mixture of 0.09 g potassium sorbate and 0.09 g sodium benzoate and 545 g in-situ H$_2$O. The in-situ H$_2$O for this formulation comprises of 0.8 g of sodium tetraborate and 4 g of sodium silicate to stabilizing the mixture. Same mixing procedure as example 1 was followed to prepare the tungsten feedstock. The feedstock was molded at 5.5, 4.6, and 3.6 wt % moisture levels. The material had excellent flowability at 5.5 and 4.6% moisture content.

Test bars 0.25"×0.5"×4.49" (0.64×1.27×12.55 cm) were molded at these moisture levels. At 5.5 wt % moisture level 18 test bars were molded by applying 750 psi ($5.2 \times 10^3$ KN/m$^2$) injection pressure and 250 psi ($1.7 \times 10^3$ KN/m$^2$) pack pressure. The average weight of the samples was 87.24±0.23 grams. At 4.6% moisture level 21 test bar samples were molded at 1000 psi ($6.9 \times 10^3$ KN/m$^2$) injection pressure and 550 psi ($3.8 \times 10^3$ KN/m$^2$) pack pressure. The average weight of these samples was 87.98±0.15 grams. The barrel temperature for both moisture levels was 88° C. (190° F.). At 3.6 wt % moisture the material did not have sufficient flowability and could not be molded.

Example 5

Iron-2% Nickel Feedstock:

This example illustrates the reactivity of the Colloid binder system with a non-corrosion resistant iron based material Carbonyl iron powder (OM powder from BASF) premixed with 2 Wt % nickel powder. A batch of iron-nickel feedstock was prepared with using Colloid binder composition of example 1. The batch consist of 7500 g premixed carbonyl iron-nickel powder, 170 g of Colloid binder composition, 780 g in-situ deionzed water containing 1.2 g of sodium tetraborate to adjust the pH of the water to about 9.4 and 0.7 g potassium chloride. Also, mixture of 0.08 g potassium sorbate and 0.08 g sodium benzoate added as biocides to inhibit the growth of molds and bacteria. Same mixing procedure as example 1 was followed to make this iron-nickel feedstock. The moisture content of shredded feedstock was adjusted to about 9 wt %. The stability of the feedstock was monitored by placing 1200 g of the feedstock in a glass bottle and sealed the material by installing a small balloon on the opening of the bottle. The bottle kept at constant temperature of 25° C. for 26 hours. The balloon was inflated by the H$_2$ gas, which is produced as a result of a reaction between iron powder and water content of the binder. The moisture content of the feedstock was monitored over a week indicated a noticeable lost of moisture due to unsuitability of the material.

Example 6

Iron-2% Nickel Feedstock:

This example shows that the addition of sodium, potassium or magnesium chromate to the water content of the binder effectively hindered the reactivity of the iron feedstock. A batch of 7500 g of premixed iron-nickel powder was made with the same formulation described in example 5 with in-situ water containing sodium, potassium or magnesium chromate. The 780 g of deionzed water for this batch comprises of 2.34 g sodium chromate, mixture of 0.08 g potassium sorbate and 0.08 g sodium benzoate added as biocides and 1.2 g of sodium tetraborate to adjust the pH of the water to about 9.4 and 0.7 g potassium chloride. Same mixing procedure as example 1 was followed to make this iron-nickel feedstock. The stability of the feedstock also, monitored by placing 1200 g of the feedstock in a glass bottle and sealed the material by installing a small balloon on the opening of the bottle. The bottle kept at constant temperature of 25° C. for 26 hours. The shape of the balloon remained unchanged after 26 hours. The sample was monitored for 45 days and no sign of unsuitability was detected. The result indicates that the addition of sodium chromate in the feedstock formulation effectively protected the iron powder in the aqueous binder medium and prevents $H_2$ evolution for extended period of time.

Two other batches with addition of potassium and magnesium chromate were evaluated. The addition of potassium and/or magnesium chromate provided same level of oxidation protection and stability for iron based feedstock material. The application of these additives is not limited by these examples. These additives could protect other non-corrosive resistant iron alloys.

The moisture content of the feedstock was adjusted to about 8 wt % and spiral flow testing was conducted on the material at 500 psi and 1000 ($3.5 \times 10^3$, $6.9 \times 10^3$ KN/m²) injection pressures. The average flow distances were 3.8±0.46" and 7.3±0.42" (9.65±1.12 cm, 18.54±1.10 cm) respectively.

Example 7

Ceramic Feedstock:

Aluminum oxide slip was prepared from 5000 g Aluminum oxide (Alcan C90) powder and 1600 g of deionzed water. The deionzed water premixed with 50 g of ammonium polyacrylate (Darvan 821A) dispersant. The pH of the water adjusted to 9.8 by adding tetramethylammonium hydroxide. The powder and in-situ water was placed in a jar mill and milled for about 25 hours. The resulting aluminum oxide slip was transferred to a sigma blender. Total of 150 g of Colloid 710H and glucose (with a ratio of 2.2 Colloid to glucose), 0.5 g sodium tetraborate and mixture of 0.1 g potassium sorbate and 0.1 g sodium benzoate was added to the sigma mixer and blended into the slip for 15 minutes. Then the temperature was raised to 93-98° C. (200-208° F.). The mixing was continued for 15-25 minutes, allowed the binder to melt, and incorporated with the slip. The mixing continued for extra 20 minutes. Then the feedstock material was allowed to cool to 25° C. (77° F.) before removing it for the mixer. The material was shredded twice to produce uniform small pieces of feedstock. The moisture content of the feedstock measured to be about 24 wt % (based on the total weight of the batch). The moisture content of the material adjusted to 18.5 wt % by evaporation of the excess moisture in air. A molding trial was conducted with the material and 65 plate 2.5"×2.5"×0.15" (6.35×6.35× 0.38 cm) samples were molded. The average dried green weight was 3.64±0.14 g. Twenty of the samples were sintered under the following conditions in a box furnace in air. The samples gained about 98.7% of the theoretical density.

| Temperature | Holding Time (hr.) | Sintering Atmosphere | Heating Rate ° C./min. |
|---|---|---|---|
| 25° C. | 0 | Air | 10 |
| 450° C. | 3.5 hold | Air | 10 |
| 1610° C. | 2.0 hold | Air | 10 |
| 25° C. | Furnace cool | Air | — |

Example 8

Direct Compounding/Molding:

In this example the powder feedstock was prepared for Direct Compounding/Molding process by mixing pre-melted binder composition from example 1 with metal powder at 25° C. A mixture of 630 grams in-situ $H_2O$ containing 0.1 gram potassium sorbate, 0.1 gram sodium benzoate, 2 g of sodium tetraborate and 1.5 g potassium chloride and 160 grams Colloid binder composition from example 1 was prepared The mixture placed in a pre-heated sigma mixer at 88° C. (190° F.) and mixed for 30 minutes to melt the binder. While mixing is continued the temperature of the mixer set to 25° C. and allowed the binder cool to room temperature. At this point, 8 kg of stainless steel 17-4PH powder was added to the binder composition and mixed at room temperature for 20 minutes. The metal powder and binder well incorporated together and form a homogeneous powder feedstock. The moisture content of the feedstock was measured to be 7.50±0.15 percent by weight of the batch. FIG. 3 illustrates a summary of the processing steps for this example.

The feedability and flow characteristic of the feedstock was evaluated. The barrel temperature of the injection molding machine (Arburg-720C) was set to about 88° C. (190° F.) and the nozzle was blocked to prevent the material exiting during the feeding. The feedstock material fed into the hopper, picked up by the machine, and filled up the barrel with no difficulties. Then the nozzle block was removed and the material pushed out by the machine through the nozzle and collected in a container in form of strand. The cross section of the strand examined under an optical microscope indicated that the material uniformly well mixed.

The average flow of the material at 500 psi and 1000 psi ($3.5 \times 10^3$, $6.9 \times 10^3$ KN/m²) injection pressure was 3.50"±0.10 and 6.2"±0.40 (8.89±0.25 cm, 15.75±1.01 cm) respectively. The result shows that the flow characteristic of this feedstock is compatible with compounded and pelletized feedstock in example 1.

The Direct Compounding/Molding process is a significant cost effective method to produce feedstock for injection molding. This process applicable to be used with any MIM graded ferrous, non-ferrous, refractory metals, ceramic or mixture of two or more of these powders and not limited to stainless steel 17-4PH powder.

Example 9

Direct Compounding/Molding:

This example presents the steps for preparation of stainless steel 17-4PH feedstock in powder format. This batch was prepared by placing 8 kg of 17-4PH stainless steel powder, 160 grams of Colloid binder composition from example 1 in a sigma mixer and blend for about 15 minutes at 25° C. An amount of 604 grams of in-situ water containing 0.1 gram potassium sorbate, 0.1 gram sodium benzoate, 2 g of sodium tetraborate and 1.5 g potassium chloride was added to the sigma mixer. The mixing continued for 20 more minutes at room temperature to uniformly incorporate the water with the powders. The moisture content of the hydrated powder feedstock measured to be about 7.40±0.10 percent by weight of the batch. FIG. 4 illustrates a summary of the processing steps for this example.

The feedability and flow characteristic of the feedstock was evaluated. The barrel temperature of the injection molding machine (Arburg-720C) was set to about 88° C. (190° F.) and the nozzle was blocked to prevent the material exiting during the feeding. The feedstock material fed into the hopper, picked up by the machine, and filled up the barrel with no difficulties. Then the nozzle block was removed and the material pushed out by the machine through the nozzle and collected in a container in form of strand. The cross section of the strand examined under an optical microscope indicated the presence of non-dissolved binder in the material. The process was repeated by raising the barrel temperature to 92° C. (198° F.) and increasing the screw back pressure from 10 psi to 55 psi (70, 385 KN/m$^2$) to improve the mixing process. The material again discharged into a container and the cross section of several strands examined under an optical microscope. The examination revealed that the material is very well mixed and all the binder was completely melted in the process.

Spiral flow experiment was conducted at 500 psi and 1000 psi (3.5×10$^3$, 6.9×10$^3$ KN/m$^2$) injection pressures to evaluate the flowability of the feedstock. The average flow distance corresponding to these pressures was 3.41"±0.25 and 6.7"±0.55 (8.66±0.64 cm, 17.02±1.40 cm) respectively. The flow characteristic of this feedstock is also compatible with compounded and pelletized feedstock in example 1.

Eight spiral samples from example 8 and eight from example 9 were sintered under sintering conditions of example 2. The samples gained about 96.8 and 96.5% of theoretical density. The low density of the samples related to the absence of applying packing pressure, which is required in molding conditions for spiral experiment.

This cost effective process also applicable to be used with any MIM graded ferrous, non-ferrous, refractory metals and ceramic or mixture of two or more of these powders and not limited to stainless steel 17-4PH powder.

Example 10

Tungsten Carbide Coating:

This example presents the aqueous coating formulation for tungsten carbide. The coating slurry composition was prepared by mixing 1.18 grams gelatine binder with 30 grams in-situ water at about 30° C. (86° F.). The in-situ water for this coating composition comprises of deionzed water, mixture of 0.001 g potassium sorbate and 0.001 g sodium benzoate as biocides, 0.6 grams sodium or potassium triphosphate, and 0.06 grams sodium tetraborate to stabilizing the pH of the solution to greater than 7. After completely dissolving the gelatine binder in the water, 100 grams of tungsten carbide powder having average particle size of 6.5 micron and small amount of de-foaming agent was added to the solution and thoroughly mixer in a sealed shaker to produce homogeneous coating slurry. The coating was applied with a paintbrush on surface of a dried green molded stainless steel 17-4PH test bar sample made with feedstock composition of example 1. The coating was dried on the substrate and strongly bonded to the surface. The coated sample was co-sintered at 1350° C. (2462° F.) under a similar conditions as in example 2.

| Temperature Rate ° C./min. | Holding Time | Atmosphere | Heating |
|---|---|---|---|
| 25° C. | 0 | Nitrogen | 10 |
| 450° C. | 3.5 hold | Nitrogen switch to hydrogen | 10 |
| 900° C. | 30 min. hold | Hydrogen | 10 |
| 1350° C. | 1.0 hold | Hydrogen | 10 |
| 900° C. | 5 min. hold | Hydrogen switch to nitrogen | 10 |
| 25° C. | 0 | Nitrogen | — |

The sample sintered to its near theoretical density with a dense layer of tungsten carbide on the surface. The average thickness of the coating was 2.3×10$^{-3}$ inches (0.058 mm).

Example 11

Multi-Layers of Molybdenum and Tungsten Coating:

This example presents composition of molybdenum and tungsten aqueous coating. The in-situ water prepared for this coating composition comprises of deionzed water, mixture of 0.15 wt % sodium tetraborate, 0.01 wt % of potassium sorbate, 0.01 wt % sodium benzoate and 1 wt % sodium silicate to stabilized the pH of the solution to about 9.2. An amount of 0.60 grams of gelatine binder was dissolved in 12 grams of the in-situ water at about 30° C. (86° F.). The tungsten coating slurry prepared by placing 116 grams of same tungsten powder from example 4 having average particle size of about 4.5 micron with 12 grams of in-situ water/binder mixture and small amount of de-foaming agent into a shaker and mixed for two or three minutes.

The molybdenum coating composition prepared with 4.0 micron powder using same in-situ water composition. An amount of 0.59 grams of gelatine binder was mixed with 12 grams of in-situ water at about 30° C. (86° F.) and mixed with 66 grams of molybdenum powder. The composition transferred into a shaker and mixed for two or three minutes.

Total of six sequential layers of molybdenum and tungsten coating applied on a green molded tungsten substrate (tungsten test bar from example 4) by using a paintbrush. Each layer of coating allowed to be dried completely before applying the next layer. The entire layer strongly bonded together and to the substrate.

This example does not limit the application of the gelatine binder formulation to molybdenum and tungsten. Other fine refractory metals powder could be used with this binder system.

Example 12

Aluminum Oxide Coating:

This example relates to preparation of aqueous aluminum oxide ceramic (Al$_2$O$_3$) coating composition. The coating was made by mixing gelatine binder with aluminum oxide slip. The aluminum oxide (Al$_2$O$_3$) slip was prepared by ball milling 350 grams of aluminum oxide (C-90 from Alcan) powder and 87.5 grams deionzed water. The deionzed water was premixed with 3.5 grams of ammonium polyacrylate (Darvan 821A) as a dispersant. The pH of the water adjusted to about 9.5 by adding small amount of tetramethyl ammonium hydroxide. The aluminum oxide powder and water placed into a jar and ball milled for 20 hours. The coating composition was made by mixing 70 grams of the slip and 1.2 g gelatine binder, mixture of 0.12 g potassium sorbate and 0.12 g sodium benzoate added as biocides. The coating was applied to one side of a green stainless steel 17-4PH test bar sample by small paintbrush, and completely dried. The coating formed a uniform and strongly bonded layer of aluminum oxide on the substrate.

It will be evident to those skilled in the art that modifications may be made departing from the essence of the present inventions. That which is sought to be protect is set forth in the following claims.

Having described the above improvements, that which is sought to be protected is set forth in the following claims:

1. A composition for molding articles comprising:
   (a) at least one powder selected from the group consisting of metal powders and/or ceramic powders,
   (b) a water-based binder comprising carrageenan,
   (c) a gel-strength enhancing chlorine compound selected from the group consisting of LiCl, NaCl and CsCl, and
   (d) in-situ water.

2. The composition of claim 1, wherein said water to be used as the solvent for said mixture has a pH of about 8.0 to 11, and which further contains a member of the group consisting of sodium tetraborate and potassium tetraborate to control said pH.

3. The composition of claim 1, which further contains a biocide.

4. The composition of claim 1, which further contains a member of the group consisting of raffinose and glucose powder to increase the gelation temperature of the composition.

5. The composition of claim 1, which contains 0.5 to 7 weight percent carrageenan binder based on solid in the mixture, a water content of 4.5-20 weight percent by overall weight of the mixture, and the balance being metal and/or ceramic powder and a gel strengthening additive.

6. The composition of claim 1, wherein said metal powder is selected from the group consisting of iron powder, low alloy steels, iron/nickel, tungsten and tungsten carbide-cobalt alloy powders, and which further contains a member of the chromate group consisting of sodium, potassium or magnesium chromate and a mixture of sodium tetraborate and sodium silicate to overcome the instability of said metal powders in an aqueous environment.

7. The composition of claim 1, wherein said metal powder is selected from the group consisting of tungsten-iron-nickel alloys and tungsten carbide-cobalt alloys and an additive for protecting said metals from attack from water is selected from the group consisting of sodium tetraborate, potassium tetraborate and a mixture of sodium tetraborate and sodium silicate.

8. A process for forming metal and/or ceramic composite parts which comprises preparing a mixture containing:
   (a) a binder material of carrageenan,
   (b) metal and/or ceramic powder,
   (c) a gel-strength enhancing chlorine compound selected from the group consisting of LiCl, NaCl and CsCl; and
   (d) in-situ water,
   and injection molding said mixture at 70-98 degrees centigrade to produce a self-supporting article.

9. The process of claim 8, wherein said carrageenan binder is k-carrageenan.

10. The process of claim 8 which employs a mixture of 0.5 to 7 weight percent carrageenan binder material based on solid in the mixture, a water content of 4.5-20 weight percent by weight of the mixture, and the balance of said mixture being metal and/or ceramic powder and a gel-strengthening additive.

11. The process of claim 8, wherein said mixture is injected into a conventional molding process at a temperature above 40-45 degrees centigrade, and thereafter cooled to a temperature below the gel-point of said carrageenan binder material to form a self-supporting article.

12. The process of claim 8, wherein the preparation of said mixture further includes the addition of 0.05 to 6 weight percent tetraborate by weight of water to maintain the water pH level at 8 to 11 pH, and a biocide to inhibit the growth of molds and bacteria.

13. A composition for molding articles comprising:
   (a) at least one powder selected from the group consisting of metal powders and/or ceramic powders,
   (b) a water-based binder comprising carrageenan,
   (c) a chromate selected from the group consisting of sodium chromate, potassium chromate and magnesium chromate; and
   (d) in-situ water.

14. A process for forming metal and/or ceramic composite parts which comprises preparing a mixture containing:
   (c) a binder material of carrageenan,
   (d) metal and/or ceramic powder,
   (c) a chromate selected from the group consisting of sodium chromate, potassium chromate and magnesium chromate, and
   (d) in-situ water;
   and injection molding said mixture at 70-98 degrees centigrade to produce a self-supporting article.

* * * * *